March 10, 1925.                                              1,529,325
G. E. STEWART
SYSTEM OF ELECTRIC DISTRIBUTION
Filed Jan. 28, 1924
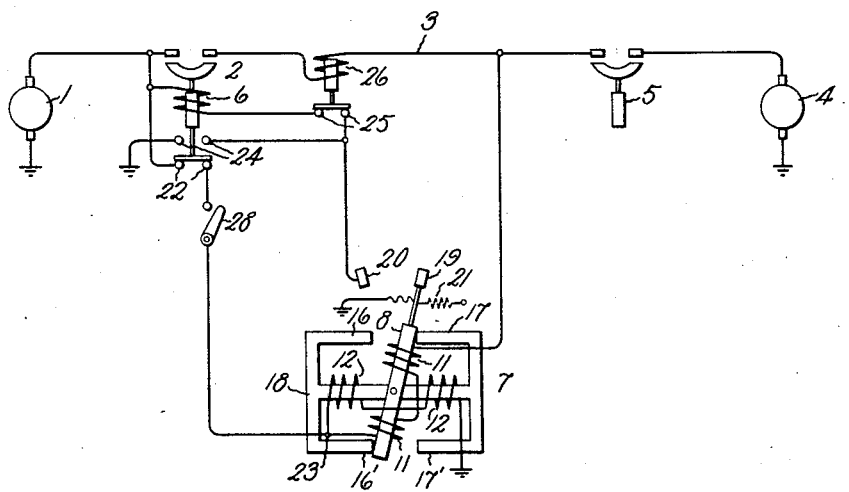
Inventor:
Glenn E. Stewart,
by
His Attorney.

Patented Mar. 10, 1925.

1,529,325

UNITED STATES PATENT OFFICE.

GLENN E. STEWART, OF PHILADELPHIA, PENNSYLVANIA, ASSIGNOR TO GENERAL ELECTRIC COMPANY, A CORPORATION OF NEW YORK.

SYSTEM OF ELECTRIC DISTRIBUTION.

Application filed January 28, 1924. Serial No. 639,146.

*To all whom it may concern:*

Be it known that I, GLENN E. STEWART, a citizen of the United States, residing at Philadelphia, in the county of Philadelphia, State of Pennsylvania, have invented certain new and useful Improvements in Systems of Electric Distribution, of which the following is a specification.

My invention relates to systems of electric distribution and particularly to an improved arrangement for controlling the connection between two electric circuits so that the connection cannot be established between them until the voltage of one of the circuits exceeds the voltage of the other circuit by a predetermined amount.

My invention is of particular utility in automatic substations where it is necessary to connect a generator to a distribution circuit which may be energized at some other point. In order to prevent the generator from operating as a motor after it is connected to the distribution circuit, it is necessary to provide suitable means for preventing the circuit breaker, which is arranged to connect the generator to the distribution circuit, from being closed until the generator voltage exceeds the circuit voltage by a predetermined amount.

One object of my invention is to provide an improved arrangement for controlling the connection between two electric circuits in accordance with the relative voltages of the two circuits, which is more sensitive and more reliable in its operation than any of the arrangements used heretofore for this purpose.

My invention will be better understood from the following description taken in connection with the accompanying drawing and its scope will be pointed out in the appended claims.

Referring to the accompanying drawing which shows one embodiment of my invention, 1 represents a direct current generator which is arranged to be connected, by means of a suitable circuit breaker 2, to a distribution circuit 3 which is adapted to be energized at some other point. As shown, one side of the distribution circuit is the ground, and the circuit breaker 2 is arranged to connect one terminal of the generator to the ungrounded side of the distribution circuit, the other terminal of the generator being permanently connected to ground. It is evident, however, that my invention is not limited to a grounded system, nor to having the circuit breaker between the ungrounded terminal and the ungrounded side of the circuit. The distribution circuit is also shown as being adapted to be energized by another source 4 which is arranged to be connected to the distribution circuit by a circuit breaker 5 which may be of any suitable type.

It is evident that in order for the generator 1 to supply current to the distribution circuit when it is energized at some other point, the voltage of the generator must be equal to the voltage of the circuit. Therefore, the voltage of the generator 1 should be higher than the line voltage before the circuit breaker 2 is closed to connect the generator to the line. For accomplishing this result, I provide a directional relay 7 which is so connected and arranged that, when the circuit breaker 2 is open, the circuit of the closing coil 6 of the circuit breaker 2 is prevented from being closed until the voltage of the generator exceeds the line voltage by a predetermined value.

The directional relay 7 may be of any suitable type, but I prefer to use the type of relay described and claimed in a copending application, Serial No. 482,630, filed July 5, 1921, by H. W. Brown and assigned to the same assignee as this application. This relay comprises an armature 8 pivotally mounted within an operating winding 11 and between pairs of polar projections 16, 16' and 17, 17', of a magnetic structure 18 which is energized by a magnetizing winding 12. The armature 8 tends to turn on its pivot in one direction or the other depending upon the direction of current in the operating winding 11, and is provided with a contact 19 which is arranged to engage another contact 20 when the armature 8 is moved in one direction. Therefore, it is obvious that when the current in the operating winding 11 is in one direction with respect to the current in the magnetizing winding 12, the contacts 19 and 20 are closed and when the current in the operating winding 11 is in the opposite direction, the contacts 19 and 20 are open.

As shown in the drawing the contacts 19 and 20 are connected in the energizing circuit of the closing coil 6 of the circuit breaker 2 so that when the contacts 19 and 20 are closed, the circuit breaker closes.

In order that the relay 7 may operate in response to the relative potentials of the generator 1 and the distribution circuit 3 to control the closing of the circuit breaker 2 when it is open, the operating winding 11 is arranged to be connected in series with the generator and the distribution circuit and the magnetizing winding 12 is arranged to be energized from a suitable source such as the generator 1 when the circuit breaker is open.

When the circuit breaker is closed, it is desirable that the contacts 19 and 20 of the relay 7 should be open so as to insure that these contacts will be open, when the circuit breaker opens, and thereby prevent the circuit breaker 2 from reclosing until the voltage of the generator is higher than the voltage of the distribution circuit. Therefore, it is desirable to arrange the connections of the directional relay 7 so that when the circuit breaker 2 closes the relay opens its contacts 19 and 20 and maintains the contacts open until the circuit breaker is open and the voltage of the generator 1 exceeds the voltage across the distribution circuit by a predetermined amount. Since the characteristic of the relay 7 is such that after the contacts 19 and 20 are closed, the energization of only the magnetizing winding 12 is sufficient to maintain the contacts 19 and 20 closed, it is necessary either to open the circuits of both windings of the relay 7, or cause the current to reverse in one of them, after the circuit breaker 2 closes, in order to make the relay open its contacts 19 and 20.

In the arrangement shown in the drawing, I have shown an improved arrangement for accomplishing these desired results. The operating and magnetizing windings 11 and 12 are permanently connected in series across the distribution circuit 3 in such a manner that when current flows from the ungrounded side of the distribution circuit 3 through these windings to ground the direction of the current through the operating winding with respect to the direction of the current in the magnetizing winding is such that the armature 8 tends to turn on its pivot in a direction to open the contacts 19 and 20. When the circuit breaker 2 is open, the auxiliary contacts 22 on the circuit breaker connect a point 23, which is between the two windings 11 and 12 in the series circuit of the windings, to the ungrounded terminal of the generator so that the magnetizing winding 12 is connected directly across the terminals of the generator 1 and the operating winding 11 is connected in series with the ungrounded terminal of the generator and the ungrounded side of the distribution circuit. This change in the connections of the windings 11 and 12 does not change the direction of the current through the magnetizing winding 12 but the direction of the current through the operating winding 11 depends upon the relative voltages of the generator 1 and the distribution circuit 3. If the distribution circuit voltage is higher than the generator voltage, after the circuit breaker 2 opens, the current through the operating winding 11 continues to flow through the winding in the same direction as when the circuit breaker is closed. Therefore, the relay 7 maintains its contacts 19 and 20 open. If, however, the generator voltage is higher than distribution circuit voltage, the current through the operating winding 11 flows in the opposite direction and when the voltage difference exceeds a predetermined value, depending upon the adjustment of the calibrating spring 21, the armature 8 rotates on its pivot in a direction to close the contacts 19 and 20 and complete the circuit of the closing coil 6 of the circuit breaker 2 so that the circuit breaker closes. The opening of the auxiliary contacts 22 on the circuit breaker 2, when the circuit breaker closes, disconnects the point 23 from the ungrounded terminal of the generator 1 so that current again flows from the ungrounded side of the distribution circuit 3 through the windings 11 and 12 in series to ground. This current causes the relay 7 to open its contacts 19 and 20 in the manner heretofore described.

It will be apparent therefore that I have provided a simple arrangement of connections whereby the current through one of the windings of the relay 7 is reversed, when the circuit breaker closes, to cause the relay to open its contacts 19 and 20.

In order that the circuit of the closing coil 6 may be completed after the circuit breaker 2 closes and the relay 7 opens its contacts 19 and 20, the circuit breaker 2 is provided with auxiliary contacts 24 which are closed when the circuit breaker is closed and which complete a circuit in shunt around the contacts 19 and 20. The circuit of the closing coil 6 may also include contacts of suitable protective devices such as the contacts 25 of an overload relay 26, so that circuit breaker may be controlled by other conditions than the relative voltages of the generator and the distribution circuit.

It may also be desirable to provide in the connection between the point 23 and the ungrounded terminal of the generator 1, a suitable switch 28, which may be either manually or automatically controlled, so that the generator may be entirely disconnected from the distribution circuit 3 under certain conditions.

While I have shown my invention in connection with an arrangement for controlling the connection between a generator and a distribution circuit, it is obvious that is not limited to such an arrangement but is applicable to controlling the connection between any two sources or independently energized circuits.

Furthermore, while I have shown and described only one embodiment of my invention, I do not desire to be limited thereto, but seek to cover in the appended claims all those modifications that fall within the true spirit and scope of my invention.

What I claim as new and desire to secure by Letters Patent of the United States, is:—

1. In combination, two electric circuits adapted to be energized independently of each other, a circuit breaker for connecting said circuits together, a directional relay for controlling the closing of said circuit breaker having two windings arranged to be connected when said circuit breaker is open so that the currents flow through said windings in the proper direction to operate said relay to effect the closing of said circuit breaker when the voltage of a predetermined one of said circuits exceeds the voltage of the other circuit, and means controlled by said circuit breaker for causing the current in one of the windings of said relay to reverse when said circuit breaker closes.

2. In combination, two electric circuits adapted to be energized independently of each other, a circuit breaker for connecting said circuits together, a directional relay for controlling the closing of said circuit breaker having two windings arranged to be connected across one of said circuits when said circuit breaker is closed, and means controlled by said circuit breaker for connecting one of said windings in series with said circuits when said circuit breaker is open.

3. In combination, two electric circuits adapted to be energized independently of each other, a circuit breaker for connecting said circuits together, a directional relay for controlling the closing of said circuit breaker having two windings arranged to be connected across one of the circuits when said circuit breaker is closed, and means controlled by said circuit breaker for connecting one of said windings across the other one of said circuits and the other one of said windings in series with said circuits when said circuit breaker is open.

4. In combination, a source of current, an electric circuit, adapted to be energized at more than one point, a circuit breaker arranged to connect said source to said electric circuit, a directional relay for controlling said circuit breaker having two windings connected across said electric circuit when circuit breaker is closed and arranged so that the current through one of said windings is in such a direction with respect to the direction of the current in the other winding that said relay is ineffective to close said circuit breaker, and means for connecting one of said windings in series with said source and electric circuit when said circuit breaker is open so that the currents in said windings are in the proper direction to cause the relay to effect the closing of said circuit breaker when the voltage of the source exceeds the voltage of the electric circuit.

5. In combination, two electric circuits adapted to be energized independently of each other, a circuit breaker for connecting said circuits together, a closing coil for said circuit breaker, a circuit for said closing coil, a directional relay for controlling said closing coil circuit having two windings arranged to be connected in a series circuit across one of said electric circuits in such a manner that the direction of current through one of said windings is such with respect to the direction of the current through the other winding as to cause said relay to maintain said closing coil circuit open, and means operative when said circuit breaker is open for establishing a connection between said series circuit and one of said electric circuits whereby the currents through both of the windings of said relay are in the proper direction to cause the relay to complete the closing coil circuit of said circuit breaker when the voltage of one of said electric circuits exceeds the voltage of the other electric circuit by a predetermined amount.

In witness whereof, I have hereunto set my hand this 24th day of January 1924.

GLENN E. STEWART.